US012682410B2

(12) United States Patent
Cole

(10) Patent No.: US 12,682,410 B2
(45) Date of Patent: Jul. 14, 2026

(54) FORECASTING ACTS USING MACHINE LEARNING AND DATA LINKAGES

(71) Applicant: ADP, Inc., Roseland, NJ (US)

(72) Inventor: Ramsay Cole, Roxbury, CT (US)

(73) Assignee: ADP, Inc., Roseland, NJ (US)

( * ) Notice: Subject to any disclaimer, the term of this patent is extended or adjusted under 35 U.S.C. 154(b) by 286 days.

(21) Appl. No.: 18/542,429

(22) Filed: Dec. 15, 2023

(65) Prior Publication Data

US 2025/0200686 A1      Jun. 19, 2025

(51) Int. Cl.
*G06Q 10/04*          (2023.01)
*G06Q 50/26*          (2024.01)

(52) U.S. Cl.
CPC ............. *G06Q 50/26* (2013.01); *G06Q 10/04* (2013.01)

(58) Field of Classification Search
CPC .................................. G06N 5/04; G06Q 10/04
See application file for complete search history.

(56) References Cited

U.S. PATENT DOCUMENTS

| | | | |
|---|---|---|---|
| 9,852,606 B1 * | 12/2017 | Heier ......................... | G03F 1/54 |
| 11,436,510 B1 * | 9/2022 | Mohler .................... | G06N 7/01 |
| 2015/0379413 A1 * | 12/2015 | Robertson .............. | G06N 5/048 |
| | | | 706/11 |
| 2016/0321563 A1 * | 11/2016 | Sinha ...................... | G06N 3/008 |
| 2019/0034820 A1 * | 1/2019 | Manning ................ | G06N 5/022 |

| | | | |
|---|---|---|---|
| 2019/0180358 A1 * | 6/2019 | Nandan ............... | G06F 18/2113 |
| 2021/0124741 A1 * | 4/2021 | Acharya ................ | G06Q 50/26 |
| 2021/0383229 A1 * | 12/2021 | Hanna ................ | G06Q 10/1053 |
| 2023/0252480 A1 * | 8/2023 | Shoumaker ............ | G06N 20/00 |
| | | | 706/46 |
| 2024/0395145 A1 * | 11/2024 | Brannan ............ | G01C 21/3685 |

OTHER PUBLICATIONS

V. Mandalapu, L. Elluri, P. Vyas and N. Roy, "Crime Prediction Using Machine Learning and Deep Learning: A Systematic Review and Future Directions," in IEEE Access, vol. 11, pp. 60153-60170, 2023, doi: 10.1109/ACCESS.2023.3286344. (Year: 2023).*

* cited by examiner

*Primary Examiner* — Wenren Chen
(74) *Attorney, Agent, or Firm* — Foley & Lardner LLP

(57) ABSTRACT

The technical solutions described herein relate to a method, system, and non-transitory computer-readable medium for forecasting (e.g., predicting) and reporting trends in crime. A method includes: filtering, by one or more processors coupled with memory, employment data and act data for a plurality of locations; identifying, by the one or more processors using a machine-learning model trained on a historic employment data and historic act data, a relationship between the employment data and the crime data; predicting, by the one or more processors based on the relationship identified by the machine-learning model, trends in acts for the plurality of locations; and generating, based on the predicted trends, a request for a preventive measure in a first location of the plurality of locations.

20 Claims, 5 Drawing Sheets

500

505

Filter employment data and act data for locations

510

Identify, using a machine-learning model, a relationship between the employment data and the act data

515

Predict trends in acts for the locations

520

Generate a request for a preventive measure in a first location

FORECASTING ACTS USING MACHINE LEARNING AND DATA LINKAGES

TECHNICAL FIELD

The technical solutions described herein relate generally to computing technology, particularly forecasting occurrences of one or more acts using a machine learning model, and, more particularly, to prevention of such acts based on the forecasting (e.g., predicting).

BACKGROUND

Acts perpetrated by entities that are not in compliance with governmental, organizational, or other rules, such as crimes, can be burdensome to prevent.

SUMMARY

At least one aspect of technical solutions described herein is directed to a method. The method includes filtering, by one or more processors coupled with memory, employment data and act data for a set of locations. The method includes identifying, by the one or more processors using a machine-learning model trained on a historic employment data and historic act data, a relationship or linkage between the employment data and the act data. The method includes predicting, based on the relationship identified by the machine-learning model, trends in acts for the set of locations. The method includes generating, based on the predicted trends, a request for a preventive measure in a first location of the plurality of locations.

In some aspects of the technical solutions described herein, the employment data includes at least one of a type of employment, type of industry, income of employees, employment rate, unemployment rate, head count for industry type, gender, and age of employees within the plurality of locations. In some aspects of the technical solutions described herein, the method includes generating, by the one or more processors, trending crime data from the employment data and act data. The method includes injecting the trending crime data into the machine-learning model to refine the machine-learning model.

In some aspects of the technical solutions described herein, the method includes providing a weight for the employment data based on an impact the employment data has on acts. In some aspects of the technical solutions described herein, the method includes determining, by the one or more processors, that a frequency of an attribute of the act data exceeds a threshold. The method includes predicting, by the one or more processors, the trends in acts for the set of locations responsive to the frequency exceeding the threshold.

In some aspects of the technical solutions described herein, the method includes generating, by the one or more processors, a remediation solution based on the trends. In some aspects of the technical solutions described herein, the method includes reinjecting, by the one or more processors, the trends into the machine learning model to refine the machine learning model for future trends in crime for the plurality of locations.

In some aspects of the technical solutions described herein, the method includes generating, by the one or more processors, a score for a first location of the plurality of locations. In some aspects of the technical solutions described herein, the method includes identifying, by the one or more processors, a query for a trend related to acts.

The method includes predicting, by the one or more processors, the trends in acts for the set of locations responsive to identifying the query. In some aspects of the technical solutions described herein, the request includes a generated remedial action based on the predicted trends.

At least one aspect of the technical solutions described herein is directed to a system. The system includes one or more processors coupled with memory. The one or more processors filter employment data and act data for a set of locations. The one or more processors identify, using a machine-learning model trained on a historic employment data and historic act data, a relationship between the employment data and the act data. The one or more processors predict, based on the relationship identified by the machine-learning model, trends in acts for the set of locations. The one or more processors generate, based on the predicted trends, a request for a preventive measure in a first location of the set of locations.

In some aspects of the technical solutions described herein, the employment data includes at least one of a type of employment, type of industry, income of employees, employment rate, unemployment rate, head count for industry type, gender, and age of employees within the plurality of locations. In some aspects of the technical solutions described herein, the one or more processors generate trending crime data from the aggregated employment data and act data. The one or more processors inject the trending crime data into the machine-learning model to refine the machine-learning model.

In some aspects of the technical solutions described herein, the one or more processors provide a weight for the employment data based on an impact the employment data has on acts. In some aspects of the technical solutions described herein, the one or more processors determine that a frequency of an attribute of the act data exceeds a threshold. The one or more processors predict the trends in acts for the plurality of locations responsive to the frequency exceeding the threshold.

In some aspects of the technical solutions described herein, the one or more processors generate a remediation solution based on the trends. In some aspects of the technical solutions described herein, the one or more processors reinject the trends into the machine learning model to refine the machine learning model for future trends in crime for the set of locations. In some aspects of the technical solutions described herein, the one or more processors generate a score for a first location of the plurality of locations.

At least one aspect of the technical solutions described herein is directed to a non-transitory computer-readable medium. The non-transitory computer-readable medium includes instructions embodied thereon that when executed cause one or more processors to filter employment data and act data for a plurality of locations. The instructions cause one or more processors to identify, using a machine-learning model trained on a historic employment data and historic act data, a relationship between the employment data and the act data. The instructions cause one or more processors to predict, based on the relationship identified by the machine-learning model, trends in acts for the set of locations. The instructions cause one or more processors to generate, based on the predicted trends, a request for a preventive measure in a first location of the set of locations.

In some aspects of the technical solutions described herein, the instructions cause the one or more processors to determine that a frequency of an attribute of the act data exceeds a threshold. The instructions cause the one or more processors to predict the trends in acts for the set of locations responsive to the frequency exceeding the threshold.

BRIEF DESCRIPTION OF THE DRAWINGS

Aspects of the technical solutions described herein are described in the detailed description which follows, in reference to the noted plurality of drawings by way of non-limiting examples of exemplary embodiments of the technical solutions described herein.

DETAILED DESCRIPTION

Figure 1:
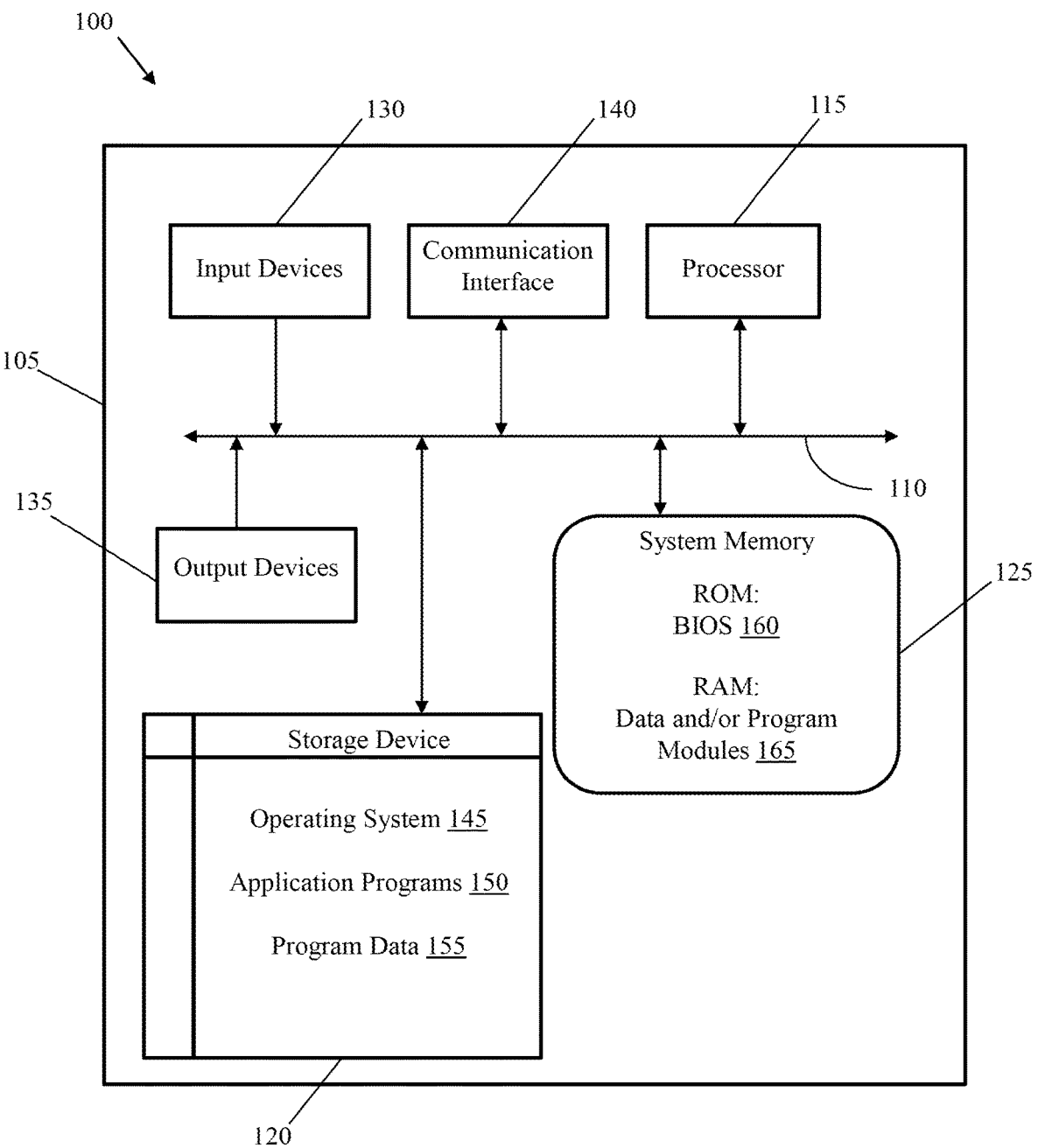
FIG. 1 is an illustrative architecture of a computing system implemented in aspects of the technical solutions described herein.

Aspects of the technical solutions described herein relate generally to a prevention system and, more particularly, to a method, system and computer program product for forecasting (e.g., predicting) and reporting trends in acts. More specifically and in accordance with aspects described in the technical solutions described herein, the technical solutions described herein leverage data from a multitude of sources to generate alerts about acts at a location. Additionally, some aspects of the technical solutions described herein provide proactive forecasts of attributes associated with the acts. For example, such attributes can include types of acts, a cost of a type of act, or a frequency of a type of acts, among others. In some aspects of the technical solutions described herein, the forecasts can be specific within particular locations. The locations can be predefined or provided by a user. Advantageously, based on the historical location, entity, and act data, predictive scores by geography can be generated to train a machine learning model to identify locations above a risk threshold for acts. This information can be leveraged by the system to generate a report including a notification to prevent an occurrence of the acts in the locations. The notification may be transmitted to an external computing device, such as a device in possession by law enforcement or security professionals such as government security agencies, private security companies, commercial businesses, etc.

Aspects of the technical solution described herein determine metrics from a variety of attributes related to acts, entities, and locations to generate a suggestion for preventing future acts based on location. Deploying preventive measures for these acts can be computationally expensive and prone to error, due to the extreme variances in entities perpetrating a large variety of acts. Prevention systems for each kind of act, such as a fence to prevent trespassing or a lock to prevent theft, lack proactive measures based on the types of entities attempting to perpetrate the acts. For example, security cameras may not provide any mitigating actions to prevent an entity from perpetrating an act. These prevention systems can fail due to their non-customized, reactive methods in contrast to the wide variety of entities they are trying to prevent from perpetrating acts.

Computational resources are wasted in reactively analyzing acts to predict future occurrences of acts. It can be technically challenging to analyze fact patterns between attributes of a geographic location, attributes of acts, and attributes of entities due to the sheer amount of information due to the computational complexity. Further, analyzing the acts may not provide enough output information to determine how to prevent the perpetration of acts in the future. Extracting relevant information from previously committed acts can be impeded by the sheer amount of information available, of which only a small portion may be relevant. Extracting relevant information from a large set of information to prevent future acts can consume large amounts of bandwidth and computational power. Furthermore, due to the widely varying characteristics of entities perpetrating acts, these analyses cannot take into account various facets, parameters, or attributes of some entities perpetrating acts. Gathering and analyzing multiple sets of data and using such information to model future acts may be challenging using traditional sources. For example, it is possible to reactively monitor acts at certain locations at certain points in time, but limited available information makes it difficult to accurately predict future changes in acts, frequency of acts, types of acts or other attributes of acts.

Aspects of the technical solutions described herein address such technical challenges by using computing technology (e.g., a machine-learning model) to identify relationships or data linkages and determine trends based on a variety of data relating to different acts, locations, and entities. The machine-learning model is specially trained using historical data related to acts, entities, and locations to determine trends in acts, such as crime, at particular locations. The machine-learning model can iteratively adapt over time as data related to entities, acts, and locations changes. Based on the determined trends, the technical solutions described herein provide a notification to suggest a mitigating action to take to prevent the act or to reduce a likelihood of the act occurring in either frequency, intensity, or other attributes of the act.

Further, the technical solutions described herein provide a practical application by analyzing employment data and act data to compute and assign scores for locations. Furthermore, by continuously monitoring changes in the data, the technical solutions described herein can request proactive measures to be taken to prevent crimes and other anti-social behavior in the locations being surveyed.

In more specific aspects, the technical solutions described herein leverage a multitude of data comprising entity attributes, acts related to entities, and locations including entities, among other data sources, to model and forecast the acts. The entity attributes include employment data within certain locations. The employment data may include, e.g., employee head headcount alongside other payroll data elements by industry and geography. More specifically, the employment data may include employment status, age, gender, marital status, income and benefits of employees, type of industry within the locations, tenure, headcount, etc.

The technical solutions described herein facilitate aggregating the data, including, for example, the plurality of attributes associated with entities, historical acts, locations and trends thereof. Further, the technical solutions described herein facilitate performing iterative analysis on the data using machine learning and/or neural network computing, to construct a predictive model of where certain acts may occur in the future. The technical solutions described herein further facilitate using the predictive model to generate notifications and reports by mapping attributes of locations and entities to acts. Upon an output of the predictive model reaching a threshold certainty, the technical solutions described herein can provide the notification and reports to an administrator. The reports and notifications are used to generate or provide remedial solutions to prevent or mitigate occurrences of future acts.

Accordingly, the technical solutions described herein address the technical problem of predicting future acts by using computing technology, particularly, machine learning to analyze data, such as employment data within specific locations. Further, the technical solutions described herein address the technical challenge of proactively and preemptively allowing for the planning of such impacts by government agencies and private security forces. The technical solutions described herein are accomplished by modelling impacts on acts using anonymized and aggregated employment data correlated with historical and/or current data associated with the acts.

The model utilizes aggregated data as described herein to generate correlations between attributes of the acts (including a type of the act, cost of a type of act, frequency of the act, among others) and attributes of entities performing the acts for a particular location. For example, the model may determine that a first type of act has been performed by entities comprising a first attribute in 80% of the acts committed over the time period of the data aggregation. For example, the model may determine that a cost (e.g., value of stolen goods, loss of revenue, evaluation of property damage, etc.) of the first type of act has historically (over the time period of the data aggregation) been higher for entities comprising a second attribute than those not comprising the second attribute. The system generates correlations for a multitude of locations in this manner. In some aspects, the system compares similar correlations across locations. For example, the system may compare a correlation between a first attribute of an entity and a frequency of a type of act across the multitude of locations.

In some aspects, the system determines differences and similarities between attributes of the multitude of locations for each similar correlation. For example, the system might determine that acts of a second type occurred less frequently during the aggregation time period in colder geographic locations. For example, the system may determine that entities possessing a second attribute have performed an act more frequently in a first type of location than a second type of location. In some aspects, the system weighs each attribute of the entities based on a number of occurrences of a particular attribute perpetrating a type of act, a cost of a type of act, or a frequency of act, among others. In some cases, the system normalizes the weights for each attribute of the entities based on the determined differences and similarities between attributes of the multitude of locations. In some aspects, using the weights, the historical entity data, the historical location data, and the historical act data, the system trains a machine learning model to determine likelihoods of a type of crime, a cost of a type of crime, or a frequency of a type of crime to occur in a given location. The machine learning model takes as input information related to entities in corresponding locations and information related to the corresponding locations. In some aspects, upon providing the input to the trained machine learning model, the system generates a report indicating locations with a high likelihood (e.g., above a threshold likelihood) for a given type of act, cost of act, or frequency of act.

Thus, aspects of the technical solutions described herein provide an improvement in the technical field of crime forecasting by providing a technical solution to the problem of inaccurate or non-existent modeling of future acts and, in cases, inadequate remedial solutions to such acts based on socio-economic factors. The aspects of the technical solutions described herein will thus allow governments, public policy makers, and private industry to make informed policy decisions based on how employment and other demographics will impact crime to, for example, reduce the cost of law enforcement and/or increase the efficiency of anti-crime measures. Accordingly, for example, it may now be possible to curb and reverse crime before it happens by implementing policy changes based on the more accurate predictive crime models as provided herein. That is, utilizing the data sets presented herein allows intentional planning, and provides communities with the required resourcing to proactively reduce negative impacts that may be caused by crime.

Aspects of the technical solution described herein may be a computer system, a computer-implemented method, and/or a computer program product. The computer program product is not a transitory signal per se, and may include a computer readable storage medium (or media) having computer readable program instructions thereon for causing a processor to carry out aspects of the technical solutions described herein. As described herein, the computer readable storage medium (or media) is a tangible storage medium (or media). It should also be understood by those of skill in the art that the terms media and medium are used interchangeably for both a plural and singular instance.

FIG. 1 is an illustrative architecture of a computing system 100 implemented in aspects of the technical solutions described herein. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 is one or more processors or microprocessors that include any processing circuitry operative to interpret and execute computer readable program instructions, such as program instructions for controlling the operation and performance of one or more of the various other components of computing device 105. For example, processor 115 enables the computing device 105 to forecast crime rates and types of crimes using real-time information such as employment data, optionally in conjunction with other type of data such as historical crime data obtained from third party sources, e.g., governments, municipalities, open sources, etc. As described in more detail herein, this data may be used initially as training data for machine learning and/or neural network computing systems.

In aspects, the employment data excludes such personal information as social security number, name, etc.; instead, the employment data includes anonymized employment information that could be used to model changes in acts including crime. Data anonymization is the process of protecting private or sensitive information by erasing or encrypting identifiers that connect to a specific individual. In some cases, statistical smoothing techniques are applied by the predictive model to address sparse or non-existent data. For example, should employment data lack information for unemployed individuals, the predictive model may deploy Inverse Distance Weighting to assign values for unemployed individuals (e.g., number of unemployed individuals, acts related to unemployed individuals, etc.) based on values of similar locations or individuals.

More specifically, and by way of non-limiting illustrative examples, real-time employment data is granular data including, for example, (i) types of industry in specific locations, (ii) number of employees in each of different industries in the specific locations, (iii) trending employment data (e.g., population migrations, employee needs, industry growth or contraction, etc.) within specific geographic locations, (iv) types of employment (e.g., administrative, blue collar, white collar, etc.), within specific locations; (v) income and other benefits of employees within specific locations; (vi) unemployment rates within specific locations; (vii) education level of employees within specific locations; (viii) retention rates and tenure of employees within specific locations; and (ix) age and gender of workforce within specific locations, and any associated trending information, etc. The processor 115 can provide trending data by utilizing the employment information from current and past trends, in addition to trending crime rates based on current and historical trends.

In some aspects, the processer 115 uses the employment data and any subset thereof to train a predictive model to determine possible locations of acts and specific types of acts. The predictive model generates correlations between the real-time employment data, e.g., employment, industry, income, etc. and the historical and act data such as current crime rates in particular locations. By way of example, specific employment data may be correlated to specific act in specific locations using machine learning and/or neural network computing to predict specific types of crime or trends that are occurring in specific locations. In this way, it is possible to predict or forecast an impact such employment data may have on crime. And iteratively processing the employment information by using the machine learning and/or neural network computing, the solution becomes intelligent and identifies which locations may need immediate or future remedial actions, e.g., more security solutions.

For example, a first industry which predominantly employees people within a location may be given a higher probability (e.g., score) for petty crimes like shoplifting, etc. than a second industry. Similarly, a location may be given a higher probability (e.g., score) that employees with a professional work force, e.g., accountants and lawyers, for white collar related crimes. In this way, it is also contemplated to place scores on different factors based on job type, industry (e.g., accounting, law, construction, food service, hospitality, medicine, etc.), or other employment data, etc. And it is contemplated that the scores can be adjusted based on different job types, different industries, different wages, etc., within different locations as described in more detail herein. By using this information in modeling, it is now possible to provide more accurate and granular models which will allow policy makers the ability to implement remedial solutions, preemptively and proactively, on best ways to curb or reverse societal impacts associated with different types of crimes. For example, barriers or gates may be placed at certain locations to prevent looting, etc.

In aspects, processor 115 interprets and executes the processes, steps, functions, and/or operations of the technical solutions described herein, which may be operatively implemented by the computer readable program instructions. In aspects, processor 115 receives input signals from one or more input devices 130 and/or drive output signals through one or more output devices 135. The input devices 130 are, for example, one or more mechanisms that permit an operator to input information to computing device 105 such as a keyboard, touch sensitive user interface (UI), etc. The one or more output devices 135 includes one or more mechanisms that output information to an operator, e.g., any display device, printer, etc.

The storage device 120 includes removable/non-removable, volatile/non-volatile computer readable media (or medium), such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the technical solutions described herein. In aspects, storage device 120 stores operating system 145, application programs 150, and program data 155 in accordance with aspects of the technical solutions described herein.

The system memory 125 includes one or more storage mediums, including for example, non-transitory media such as flash memory, permanent memory such as read-only memory ("ROM"), semi-permanent memory such as random access memory ("RAM"), any other suitable type of storage component, or any combination thereof. In some aspects, an input/output system 160 (BIOS) including the basic routines that help to transfer information between the various other components of computing device 105, such as during start-up, is stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 includes any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 is connected to remote devices or systems via one or more local area networks (LAN) and/or one or more wide area networks (WAN) using communication interface 140.

As discussed herein, in some aspects computing system 100 is configured to provide more accurate predictive models using granular, real-time data, e.g., payroll data. In some aspects, the computing device 105 performs tasks (e.g., process, steps, methods and/or functionality) in response to processor 115 executing program instructions contained in a computer readable medium, such as system memory 125. In some aspects, the program instructions are read into system memory 125 from another computer readable medium, such as data storage device 120, or from another device via the communication interface 140 or server within or outside of a cloud environment. In aspects, an operator interacts with computing device 105 via the one or more input devices 130 and/or the one or more output devices 135 to facilitate performance of the tasks and/or realize the end results of such tasks in accordance with aspects of the technical solutions described herein. In additional or alternative aspects, hardwired circuitry is used in place of or in combination with the program instructions to implement the tasks, e.g., steps, methods and/or functionality, consistent with the different aspects of the technical solutions described herein. Thus, the steps, methods and/or functionality disclosed herein can be implemented in any combination of hardware circuitry and software.

Figure 2:
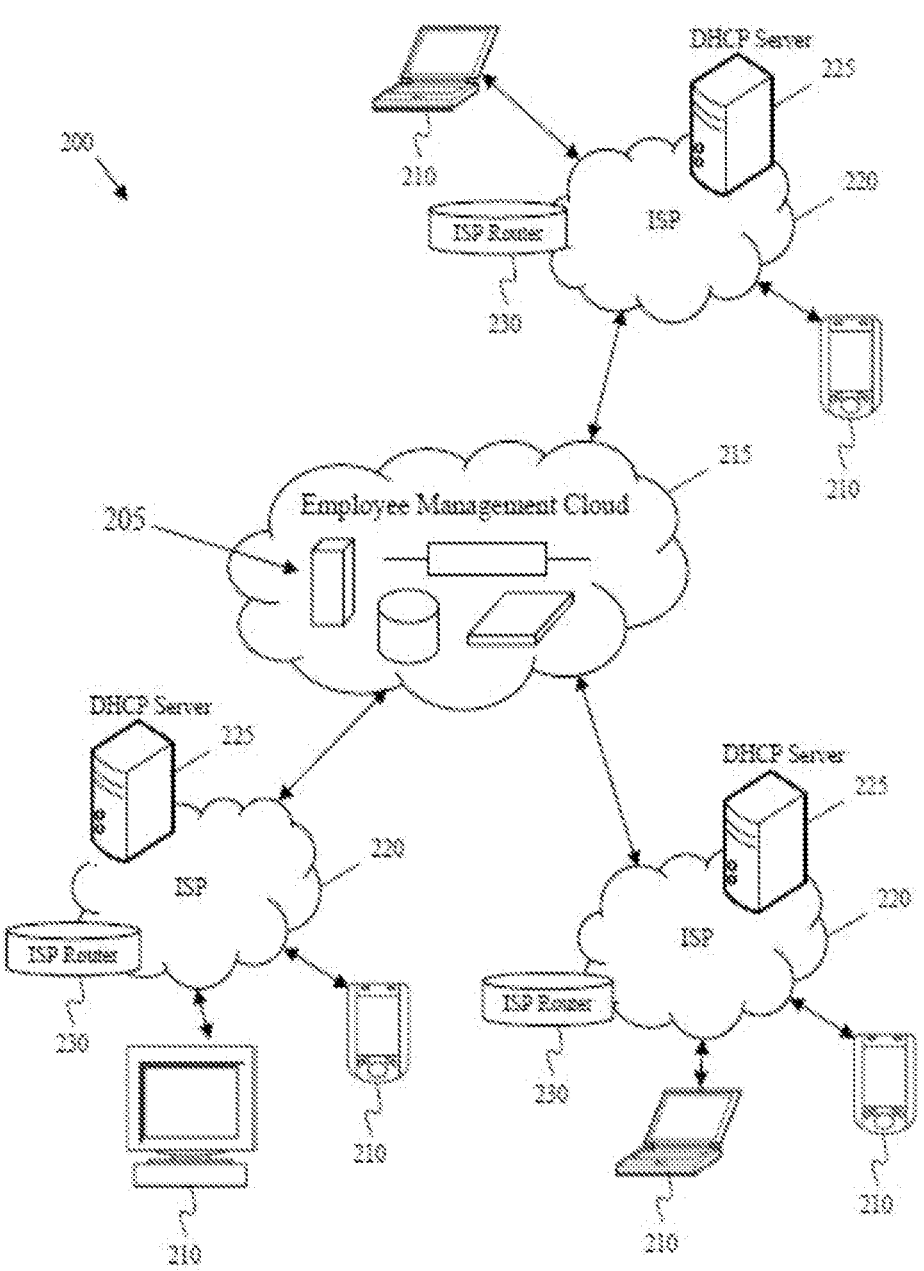
FIG. 2 shows an exemplary cloud computing environment in accordance with aspects of the technical solutions described herein.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, which can be provisioned and released rapidly, dynamically, and with minimal management efforts and/or interaction with the service provider. In aspects, one or more aspects, functions and/or processes described herein are be performed and/or provided via cloud computing environment 200.

As depicted in FIG. 2, cloud computing environment 200 includes an employee management cloud 215 which is connected to one or more internet services providers (ISPs) 220. In some aspects, the ISPs are configured to provide internet to one or more client devices 210. In some aspects, the employee management cloud 215 includes one or more cloud resources 205 can include a variety of hardware and/or software computing resources, such as servers, databases, storage, networks, applications, and platforms. In some aspects, the cloud resources 205 are on a single network or a distributed network. The cloud resources 205 may be distributed across multiple cloud computing systems and/or individual network enabled computing devices.

In some aspects, multiple ISPs 220 are connected to the employee management cloud 215. In some aspects, the ISPs provide internet to one or more client devices 210. The client devices 210 may be utilized by one or employees to sign into a work system. In some aspects, an employer desires to monitor the location of the client device 210 to ensure that the employee is logging in from an approved location. In some aspects, each of the ISPs 220 may include a DHCP server 225 which is a server that automatically provides and assigns network parameters, such as IP addresses, to the client devices 210. A DHCP server 225 may eliminate the need for the ISP 220 to manually set the IP address for each of the client devices 210. In some aspects, the DHCP server works with a modem to assign IP addresses to the client devices. The ISP 220 may also include an ISP router which allows multiple devices, such as client devices 210, to connect to the internet network created by the modem.

Client devices 210 comprise any suitable type of network-enabled computing device, such as servers, desktop computers, laptop computers, handheld computers (e.g., smartphones, tablet computers), set top boxes, and network-enabled hard drives. The cloud resources are typically provided and maintained by a service provider so that a client does not need to maintain resources on a local client device 210. In aspects, the cloud resources includes one or more computing system 100 of FIG. 1 that is specifically adapted to perform one or more of the functions and/or processes described herein.

Client devices 210 may comprise any suitable type of network-enabled computing device, such as servers, desktop computers, laptop computers, handheld computers (e.g., smartphones, tablet computers), set top boxes, and network-enabled hard drives. The cloud resources are typically provided and maintained by a service provider so that a client does not need to maintain resources on a local client device 210. In aspects, the cloud resources may include one or more computing system 100 of FIG. 1 that is specifically adapted to perform one or more of the functions and/or processes described herein.

In some aspects, cloud computing environment 200 is configured such that the cloud resources provide computing resources to client devices 210 through a variety of service models, such as Software as a Service (SaaS), Platforms as a service (PaaS), Infrastructure as a Service (IaaS), and/or any other cloud service models. The cloud resources are configured, in some cases, to provide multiple service models to a client device 210. For example, the cloud resources can provide both SaaS and IaaS to a client device 210. The cloud resources 205 are configured, in some cases, to provide different service models to different client devices 210. For example, the cloud resources can provide SaaS to a first client device 210 and PaaS to a second client device 210.

In some aspects, the cloud computing environment 200 is configured such that the cloud resources provide computing resources to client devices 210 through a variety of deployment models, such as public, private, community, hybrid, and/or any other cloud deployment model. The cloud resources are configured, in some cases, to support multiple deployment models. For example, the cloud resources can provide one set of computing resources through a public deployment model and another set of computing resources through a private deployment model.

In aspects, software and/or hardware that performs one or more of the aspects, functions and/or processes described herein is accessed and/or utilized by a client (e.g., an enterprise or an end user) as one or more of a SaaS, PaaS, and IaaS model in one or more of a private, community, public, and hybrid cloud. Moreover, although this disclosure includes a description of cloud computing, the systems and methods described herein are not limited to cloud computing and instead can be implemented on any suitable computing environment.

In some aspects, the cloud resources are configured to provide a variety of functionality that involves user interaction. Accordingly, a user interface (UI) can be provided for communicating with cloud resources 205 and/or performing tasks associated with the cloud resources. In some aspects, the UI is accessed via a client device 210 in communication with the cloud resources. In some aspects, the UI is configured to operate in a variety of client modes, including a fat client mode, a thin client mode, or a hybrid client mode, depending on the storage and processing capabilities of the cloud resources and/or client device 210. Therefore, a UI can be implemented as a standalone application operating at the client device in some aspects. In other aspects, a web browser-based portal is used to provide the UI. Any other configuration to access cloud resources 205 can also be used in various aspects of the technical solution described herein.

Figure 3:
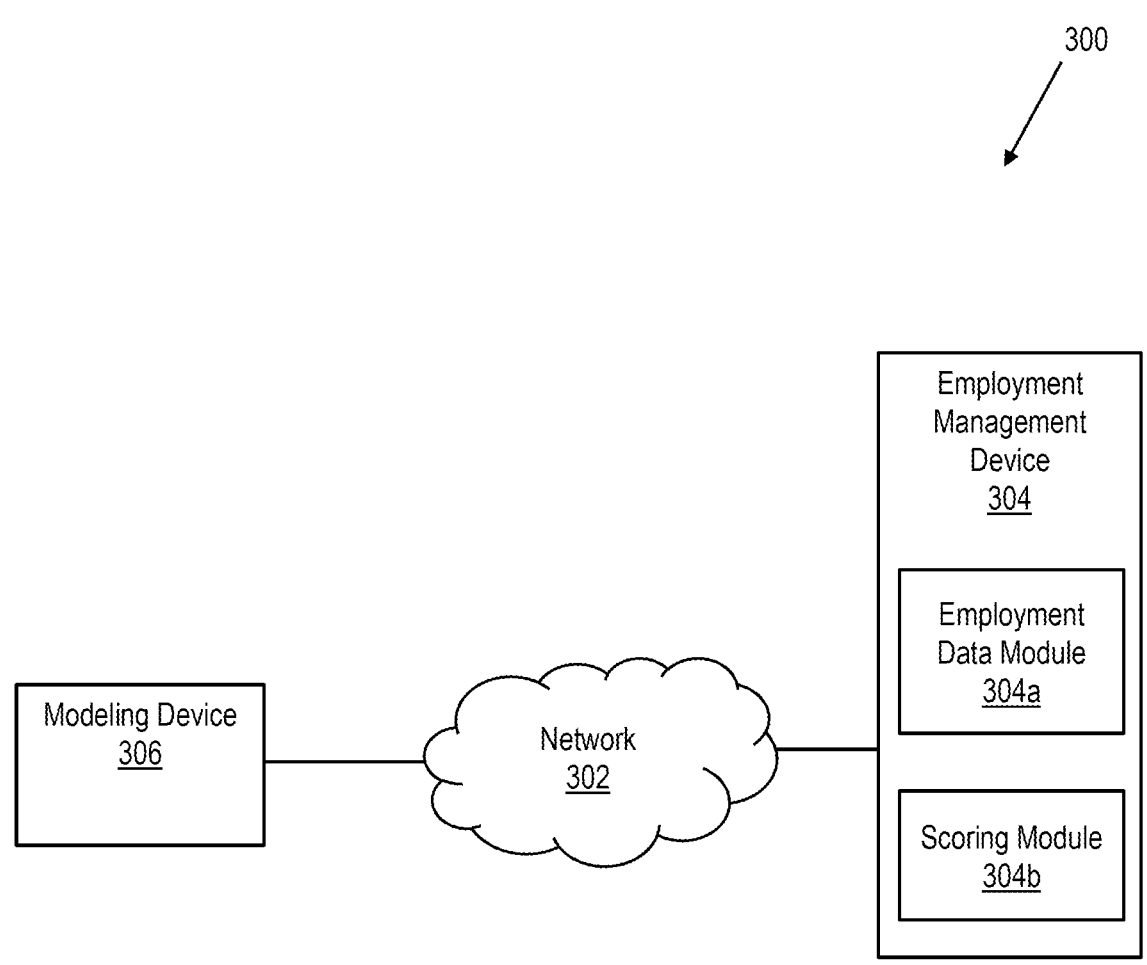
FIG. 3 shows a block diagram in accordance with aspects of the technical solutions described herein.

FIG. 3 shows a block diagram in accordance with aspects of the technical solutions described herein. More specifically, FIG. 3 shows a functional block diagram 300 that illustrates functionality of aspects of the technical solutions described herein. The functional block diagram 300 of FIG. 3 includes a network 302 enabling communication between an employment management device 304 and a modeling device 306. In some aspects, the network 302 is representative of the cloud infrastructure of FIG. 2.

In some aspects, the employment management device 304 and modeling device 306 each comprise one or more program modules such as program modules 165 described with respect to FIG. 1. The devices 304 and 306 include additional or fewer modules than those shown in FIG. 3. In aspects, separate modules are integrated into a single module. Additionally, or alternatively, a single module is implemented as multiple modules. Moreover, the quantity of devices and/or networks in the environment is not limited to what is shown in FIG. 3. In practice, the environment may include additional devices and/or networks; fewer devices and/or networks; different devices and/or networks; or differently arranged devices and/or networks than illustrated in FIG. 3.

In aspects, the employment management device 304 comprises employment data module 304a and scoring module 304b, each of which may comprise one or more program modules such as program modules 165 described with respect to FIG. 1. In aspects, the employment data module 304a includes employment data collected (i.e., aggregated) from payroll data received from third-party sources. In some aspects, the data is aggregated in different ways from zip code to industry type to unemployment rate to wages, or to other demographics. In some aspects, the third-party sources include governmental sources or private sources through an opt-out or opt-in process. A government source includes the social security administration, internal revenue service, unemployment administration, or other government agencies that collect information. The private source includes a payroll company such as ADP Inc. The payroll data may be collected (i.e., obtained) from a payroll module (i.e., data sources), which is maintained by the third-party source. s Advantageously, collection of data includes any type of employment data which is provided in real-time or near real-time. The employment data will provide accurate modeling capabilities compared to relying on static/point in time data sets; that is, payroll data that collected at shorter periods of time will better reflect trends in crime at specifically identified locations such as trends in crime that may occur due to changes in employment or other changes in demographics. As already noted herein, information obtained from the employment data module 304a includes, as examples and amongst other things: (i) number of employees in each of the different industries within specific locations; (ii) type of employment (e.g., clerical, manufacturing, services, administrative, professional, etc.); (iii) wages, e.g., income and other benefits of employees within specific locations; (iv) unemployment rates for specific industries, (v); unemployment rates within specific locations; and (vi) education level of employees with specific locations, in addition to other factors described herein.

As should be understood, in some aspects portions of the employment data are associated with particular types of acts or, e.g., petty crimes, misdemeanors, violent crime, drug usage, white collar crime, burglary, robbery, etc. For example, the type of employees in each of the different industries is indicative or predictive that certain crimes may occur in the future. This data may be trained upon in an iterative manner using machine learning and/or neural networking computer to further refine the association between employment data and crime within the predictive model.

The scoring module 304b is configured to provide a weighting to data. For example, the scoring module 304b is used to provide different weights to each of the different data from the employment data module 304a. For example, the scoring module 304b has an increased confidence that a certain industry will have a greater impact on acts based on indications in payroll data and thus weight it accordingly. Illustratively, payroll decreases are a strong indicator of unemployment and, hence, a correlation would be made that certain crimes such as petty larceny or drug usage will occur in the future. This information can then be weighed more heavily. In some aspects, the scoring module 304b takes into consideration the location and type of industry, hence leading to a higher or lower score. For example, a location associated with a geographic perimeter that predominantly employs people in white collar professions would not be given a high score for petit larceny; instead, a high score may be provided to white collar crimes such as fraud or embezzlement.

In some aspects, the data from the employment data module 304a and the scoring module 304c is injected (e.g., transmitted/sent) to the modeling device 306. In aspects, the modeling device 306 will use the obtained data to train on and model or forecast different types of crimes based on the demographics of the specific location. Accordingly, the modeling device 306 leverages this employment data with other legacy data such as historical crime rates and trends thereof such as increases in crime rates upon an occurrence of an event, e.g., mass layoffs in a particular industry, and types of acts based on employment data to formulate an accurate model to forecast specific crimes in specific locations. For example, a spike in crime may be correlated to a mass layoff, which can be used in the model for predictive modeling and preemptive remediation.

Moreover, the modeling device 306 looks at current trends between the employment data and act data and, through an iterative process using machine learning and/or neural network computing, refine the predictive model to better predict upcoming trends in crime rates and types of crimes in a particular location. In some aspects, the modeling device 306 uses the scores to provide different weightings to different types of crimes that may occur based on the demographics, e.g., real-time employment data. For example, considering employment data, it is now possible to use real-time granular data to forecast current and future crime based on geography, industry, employment type, etc.

It should be understood by those of ordinary skill in the art that the employment data and how it is associated with crime, etc., can be used as quality training data for the machine learning and neural network computing as provided herein. The training data refers to the initial data that is used to develop a machine learning model, from which the model creates and refines its predictions. The quality of the employment data and its associated correlated consequences on crime can be refined based on trending data and other data from legacy or open sources from third parties. The employment data can be mined from the business decisions and activities that are already known or which are being refined.

The employment data is clean and formatted consistently for training purposes, e.g., the data is normalized. In some cases, the computing system filters the data including the employment data and act data for a set of locations. In some aspects, the computing system filters the data by normalizing the data. Data normalization is the practice of organizing data entries to ensure they appear similar across all fields and records, making information easier to find, group and analyze. Some examples or data normalization include industry type, job titles, locations, job responsibilities, etc. The computing system may employ (via the predictive model) normalization methods such as min-max scaling or Z-Score standardization.

In some aspects, a normalization of data includes, e.g., NAICS Code Structure. NAICS is a two-through-six-digit hierarchical classification code system, offering five levels of detail. Each digit in the code is part of a series of progressively narrower categories, and the more digits in the code signify greater classification detail. For example, (i) the first two digits designate the economic sector; (ii) the third digit designates the subsector; (iii) the fourth digit designates the industry group, the fifth digit designates the NAICS industry; and (v) the sixth digit designates the national industry. It is also contemplated to use geo-identifiers based on state, county, metropolitan regions, congressional districts, etc.

In addition, in some aspects the remediation suggestion and its associated consequences on crime are used as training data for further refinement of remediation efforts as described herein. That is, by using an interactive process, it is possible to train on and refine remediation efforts based on the different combinations of variables that may be used with respect to employment data. For example, the training data is the initial dataset used to train machine learning algorithms, and the models create and refine their rules using this data.

Machine learning is an application of Artificial Intelligence (AI) that enables systems to learn from vast volumes of data and solve specific problem, which would not otherwise be practical or possible in the human mind or by pen and paper. In aspects, machine learning starts with data, e.g., employment data and act data, which is gathered and prepared to be used as training data, i.e., the information the machine learning model will be trained on. The more data, the better the predictive model becomes. From here, the computer model will train itself to find patterns and make predictions. In this way, the machine learning can be predictive, meaning the system uses the data to predict what crime may happen based on specific demographics in specific locations. In further aspects, the machine learning is supervised by machine learning models trained with labeled data sets, which allow the models to learn and grow more accurate over time. Unsupervised machine learning is also contemplated herein. By way of some example, the machine learning may be linear regression, logistic Regression, K Nearest Neighbor or Naive Bayes as examples.

Figure 4:
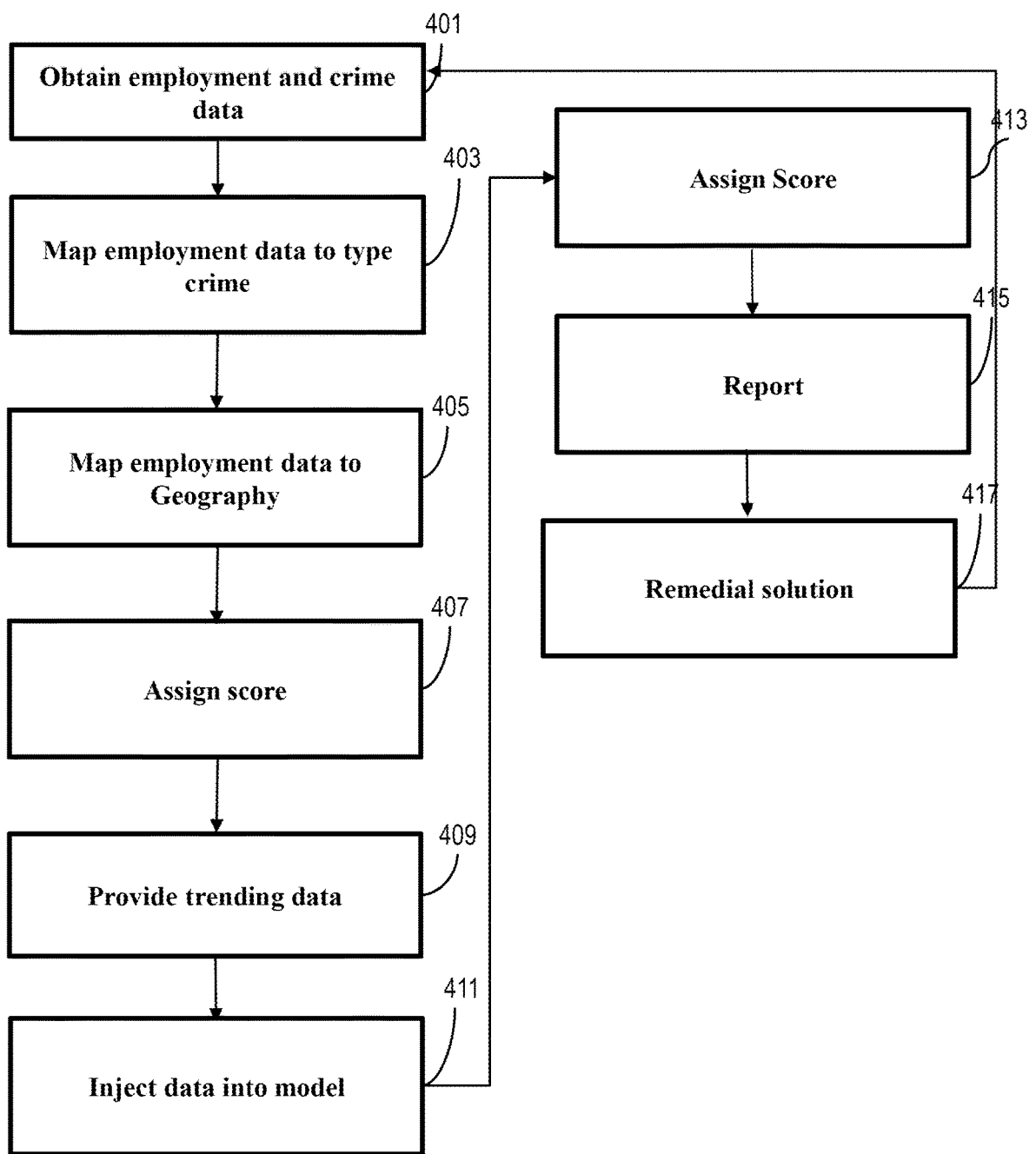
FIG. 4 depicts an exemplary for a process in accordance with aspects of the technical solutions described herein.

FIG. 4 depicts an exemplary flow for a process in accordance with aspects of the technical solutions described herein. The exemplary flow can be illustrative of a system, a method, and/or a computer program product and related functionality implemented on the computing system of FIG. 1, in accordance with aspects of the technical solutions described herein. In some aspects, the computer program product includes computer readable program instructions stored on computer readable storage medium (or media). In some aspects, the computer readable storage medium may includes the one or more storage medium as described with regard to FIG. 1, e.g., non-transitory media, a tangible device, etc. In some aspects, the method, and/or computer program product implementing the flow of FIG. 4 is downloaded to respective computing/processing devices, e.g., computing system of FIG. 1 as already described herein, or implemented on a cloud infrastructure as described with regard to FIG. 2. Accordingly, the processes associated with each flow of the technical solutions described herein can be implemented by special purpose hardware-based systems that perform the specified functions or acts or carry out combinations of special purpose hardware and computer instructions.

At step 401, the processes obtain employment information and crime data for specific locations. This employment information includes any of the above noted information over any predetermined time period, e.g., months to years, and trending data as described herein. The employment information and historic crime statistics, for example, are layered together and used to train on as described herein in order to provide a predictive analysis of types of acts that may occur based on demographic information, e.g., employment information. The act data is current statistics, studies, and other observational information over any predetermined amount of time, e.g., months to years, obtained from third party sources. For example, additional information are studies that have linked different employment demographics to different types of crime. This additional information can also be used to weigh different factors as described with respect to the crime score of step 407.

At step 403, the processes aggregate the data and map this aggregated employment information to a type of crime or crime rates, or other crime statistics based on specific locations. The data may be aggregated in different ways from zip code to industry type to unemployment rate to wages, or to other demographics. For example, the mapping may include mapping of job types associated with an industry to a certain type of crime in a specific location. At step 405, the processes map the employment information to locations. In this way, specific crimes in specific locations can be mapped to different demographic information, e.g., employment data as described herein.

At step 407, the processes assign a crime score to the employment information, i.e., industry type, type of employment (e.g., white collar, blue collar, administrative, services, etc.). In aspects, a higher crime score will be indicative of a higher weight assigned to the particular data, whether that be an observational study of crime types and other demographical information, which can be used in the predictive model to predict a certain type of crime in a specific location based on certain employment data or other demographic factors. In a non-limiting illustrative aspect, the crime score is based on a scale of 0-100, with 100 being assigned to a piece of employment data having the greatest impact on certain crimes.

In aspects, the crime score (e.g., weight) can be generated/provided with any combination of the data, e.g., an increase in wages may lower a crime score for a particular type of employment, whereas a decrease in wages for the same type of employment may raise the crime score. By way of another example, a male may be given a higher score than a female for violent crimes, whereas an older workforce may be assigned a lower score for the same type of violent crimes regardless of gender. In this way, the crime score may be adjusted and can be different depending on many different factors.

At optional step 409, the processes provide a trending of the employment data and map the trending information, e.g., industry type and/or employee type, wages, etc. In some aspects, the trending information includes headcount or other demographic information, e.g., growth of industry, employment growth or decline, wage growth or decline, etc. In some aspects, this trending information is obtained by extrapolating the employment information over time.

At step 411, the processes inject the aggregated employment information and crime data into the predictive model (machine learning) to generate a granular and predictive model of a particular type of crime that may be committed in a particular location based on an employment demographic. In aspects, for example, it is determined that petty crimes spike three weeks after a mass layoff in a certain location. Accordingly, as the crime model now includes granular data which is weighted based on employment data, and which includes trending data for employment and crime, a more accurate, predictive model is generated and used for remediation and policy purposes. Also, by using the trending data of industry, etc. it is possible to determine how such data will have an impact on crime before it actually happens. This impact can be even more accurately reflected by weighting certain factors more heavily than others.

At step 415, the processes generate a report associated with the model. In some aspects, the generated report(s) uses of the machine learning model by extrapolating trends in the employment data to determine indicators that predict future impacts on crime from employment data. The generated report(s) may provide explanations of how employment data will impact crime. For example, the report forecasts of change in crime based on certain industries or trending employment information.

In aspects, the reports include a score for each location with a particular governmental jurisdiction or other region. In some aspects, this score is generated in step 413 based on the likelihood that certain crimes will be committed in certain locations. For example, a higher score within a certain region of a police jurisdiction is generated due to predicted crime based on recent layoffs, current or future unemployment or even a new industry opening a facility which would increase the workforce and overall population of the specific location.

Illustratively, a single jurisdiction is segmented into 100 different locations, with each location being assigned a score from 1 to 100. In aspects, the score of 100 is a location that is expected to have a spike in crime; whereas a score of 1 is a location that is expected to have a low incidence of crime. These scores can dynamically change as the demographics change, e.g., employment data. For example, as employment decreases in a certain region or wages increase in a certain region, the scores increased and decreased for such region, respectively. In this way, the predictive model generates a unique predictive scoring model which can be used by a police force, for example, to prioritize their staffing needs for certain locations within their jurisdiction.

At step 417, the reports are used to create a more predictive solution to crime, i.e., generate remediation solutions. In aspects, reports are provided at any predetermined time interval such as daily, weekly, or monthly. In aspects, the reports are used for creating remediation efforts such as increasing wages, inviting different industries within the location by, for example, providing tax credits, or other micro/macro remediation efforts, etc., including those related to prevention of crime, itself. For example, barriers can be placed at certain locations or increased policing, or social services can be provided at certain locations where crime is forecasted to increase. The remediation solution can be provided to a government agency or private industry or other public policy stakeholders. In aspects, the updated crime statistics, employment data and, optionally, remedial solutions are injected back into the model for further refinement of the predictive models. In this way, an iterative process is implemented to refine or update any of the suggested remedial actions, e.g., increase or decrease police presence at a certain location, place barriers at certain locations or allocate resources in another appropriate manner. Thus, the modeling is very dynamic and can be constantly refined.

In some aspects, these reports are provided by push notifications, emails, text-messaging, among others. For example, a head of security for a Fortune 100 company with offices worldwide receives notices via email or text message about predictive crime in different locations. The security force then uses this information to proactively increase security at such a location.

Figure 5:
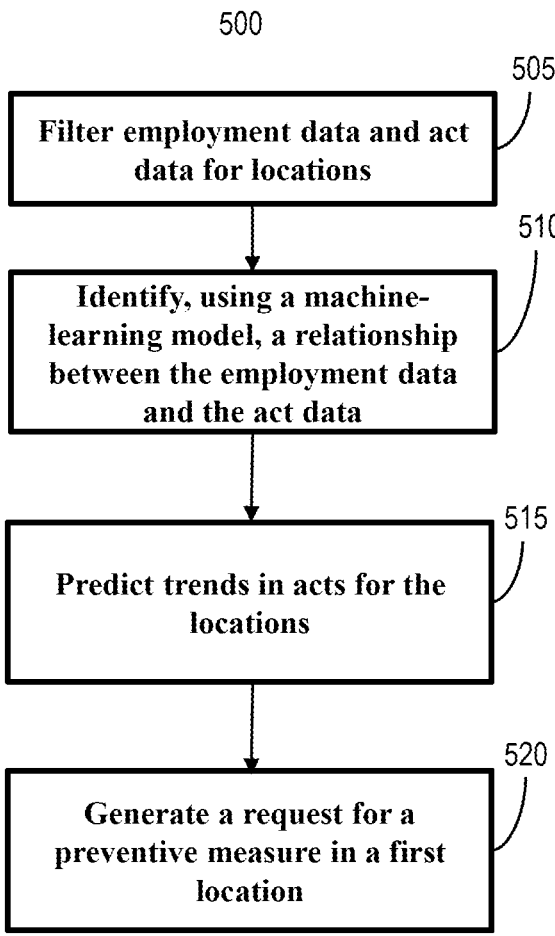
FIG. 5 depicts a method for forecasting and reporting trends in acts, according to one or more aspects of the technical solutions described herein.

FIG. 5 depicts a method 500 for forecasting and reporting trends in acts. The method 500 can include steps 505-520. The steps in method 500 are meant by example and may include additional or fewer acts than those depicted. The steps in method 500 may be performed in an order other than that depicted in method 500, by computer components such as those described with reference to FIG. 1.

At step 505, the method includes filtering employment data and act data for locations. The system receives employment data and act data for a set of locations from a variety of sources. The sources can include databases, corporations, libraries, governmental statistics, or data aggregated by the system itself. The data can be labelled or unlabeled. For example, a source of the sources may label the data according to type of employment, percentage, etc., or include headers that identify the dataset. In some cases, the system can, upon receiving the data, use machine learning to identify and label the dataset. For example, the system can use natural language processing, TF-IFD, or other classification algorithms to identify the data and normalize the data to a set of standard labels. In some aspects, the act data and employment data is aggregated over a period of time. For example, the system aggregates the date over a period of time from web scrubbing, public databases, and privately collected data and assigns labels to the data to enable filtering. In some cases, the data includes a timestamp or a geolocation to indicate a time of the receipt of the data or a location for where the data is relevant, respectively.

The locations can include or refer to geographical areas. For example, the locations can include regions defined by political boundaries, a geofence, a perimeter from a point of interest, natural boundaries (e.g., rivers or mountain ranges), among others.

The employment data includes employment data as described herein, including data related to employees. Data related to employees includes information related to demographics of employees. For example, data related to employees includes age, race, gender, ethnicity, socioeconomic standing, familial standing, public records, among others. Employment data includes industries in which employees are employed (e.g., construction, oil and gas, customer service, etc.), wage or salary information (e.g., average salary for a particular location of the plurality of locations, actual salary of a particular employee, etc.), locations of industries, among others.

Act data includes data about acts perpetrated in the locations. As described herein, in some aspects, act data includes crime information, such as crime statistics. Act data includes a type of act, such as a felony, misdemeanor, petit larceny, grand larceny, vandalism, arson, among others. Act data includes a frequency of a type of act, such as a frequency of grand larceny, across the plurality of locations, a subset of the location, or a particular location.

The system filters the act data and the employment data for the locations. In some aspects, the system normalizes the data as described herein. In some aspects, the system scrubs the data to remove outliers within a dataset. For example, the system may normalize the data to account for abnormalities in the act or employment data due to natural disasters, economic depressions or recessions, pandemics, among other anomalous events. In some aspects, the system filters the act data and employment data for a particular location or subset of locations of the locations. For example, the system can filter the data to generate a subset of act data based on acts that occurred within a specified perimeter of a workplace.

At step 510, the method includes identifying, using a machine learning model, a relationship between the employment data and the act data. The method 500 can identify the relationship at step 510 responsive to filtering the employment data and act data for locations at step 505. In some aspects, the system trains a machine-learning model as described herein to identify the relationship between the employment data and the act data responsive to filtering the employment data and act data for the locations. The machine-learning model is a predictive model which identifies correlations between data to enable predictions. In some aspects, the predictive model includes one or more of a geospatial analysis, regression models, recursive neural networks, convolutional neural networks. As an example, the predictive model takes as input demographic, socioeconomic, environmental data of the locations, and public arrest records to determine a relationship between frequency of acts and climate of a location.

At step 515, the method includes predicting trends in acts for the locations. The method 500 can include predicting the trends in acts responsive to identifying the relationship using the machine learning model at step 510. The system predicts trends in acts for the locations responsive to identifying the relationship between the employment data and the act data using the predictive model. In some cases, the system predicts the trends responsive to a query for trends for one or more particular locations. The system predicts one or more trends for each location or for a subset of the locations. Predicting trends in acts can include identifying locations with a high likelihood (e.g., above a threshold likelihood) of a type or frequency of act to occur. For example, a trend can relate to a prediction of a type of crime or a frequency of a type of crime to occur in a particular location or subset of locations. In some cases, the system predicts the trends based on employment data for the location. For example, the system may predict a trend based on an unemployment rate of a location and the relationship. For example, the system may predict a trend based on a the percentage of people in a location that a type of industry employs. In some cases, predicting a trend includes predicting a future time period for the trend. For example, the trend may identify a time period in which acts are likely to occur.

At step 520, the method includes generating a request for a preventive measure in a first location. The method 500 can include generating the request responsive to predicting the trend in the act for the location at step 515. The system can identify, based on the trends identified for the locations and using the trained predictive model, a first location that is above a threshold likelihood of a quantity of a type of act occurring, a frequency of a type of act occurring, a severity of acts occurring, among others. The system may transmit the request indicating the preventive measure as a notification to one or more entities, administrators, or systems associated with the first location above the threshold likelihood of a quantity of a type of act occurring. In this way, the notification can include or present information on the first location as to trends in acts occurring or predicted to occur at the first location.

The preventive measure is a mitigating action, effort, remedial solution, or intervention, as described herein, for preventing the future occurrence of acts. In some cases, the preventive measure aims to change the trends as predicted by the predictive model. For example, a preventive measure seeks to reduce the severity, frequency, or quantity of acts predicted to be committed in the first location. Preventive measures include educational programs, community policing, mental health services, implementation of technology and surveillance, cybercrime prevention efforts, employment and economic development, among others.

In some cases, the preventive measures include actions to actuate a remote monitoring and management service (RMM) to manage a computing device, such as a mobile device, laptop, or desktop computing device. In some aspects, an entity (i.e., a corporation, individual, organization, company, etc.) employs an RMM on one or more devices associated with the entity. The one or more devices associated with the entity can include laptops, cellular devices, desk top computers, tablets, or other computing systems associated with the entity. In some aspects, upon a determination that a location indicates a trend of acts above a threshold, the system may transmit a notification or instructions to enact one or more measures. For example, the system transmits a notification to personnel associated with the entity to warn, list, or otherwise demonstrate the location above the threshold. In some aspects, the system causes one or more actions to occur on behalf of the RMM system employed by the entity. For example, in some aspects the system causes one or more client devices of individuals employed by, contracted to, or otherwise associated with the entity to request a change in an authentication credential.

In some cases, the preventive measures include actions to actuate a home security system. In some aspects, the system sends a notification indicating that a location of a home utilizing the home security system is within a perimeter of a location above a threshold likelihood for trends related to acts. The system sends, in some aspects of the technical solutions disclosed herein, a notification that a home is within a location with a trend related to occurrences of burglary. In some aspects, the system causes the home security system to actuate one or more subsystems of the home responsive to receiving the notification. In an example, the system locks a door of the home, turns on security cameras of the home, turns on one or more light sources of the home, enables sensors (e.g., motion or sound sensors) of the home, among others, to mitigate a predicted crime trend for the location in which the home is located.

In some cases, the preventive measures include actions to actuate protective entity systems. In some aspects of the technical solutions disclosed herein, the system causes one or more subsystems of an entity to actuate responsive to receiving the notification. For example, the system emits an alarm or siren, locks one or more turnstiles, requests a change in credentials for one or more client devices, transmits an alert to one or more individuals associated with the entity, actuates a sprinkler system of a building, among others.

In some cases, the preventive measures can include actions related to an electric vehicle. In some aspects, the system performs one or more actions responsive to receiving the notification indicating the first location that is above a threshold likelihood of an act. As an example, the system causes an electric vehicle to alert a driver of the electric vehicle via a user interface of the electric vehicle or a client device associated with the driver of the electric vehicle, responsive to receiving the notification. In some aspects, as a preventive measure, the system causes the electric vehicle to perform one or more actions such as locking doors of the electric vehicle, preventing or warning against idling within the first location, emitting an alarm, preventing windows from opening, blacking-out or otherwise tinting windows of the electric vehicle, among others.

The system may transmit the request as a notification to an administrator device. The notification alerts the administrator that a preventive measure should be taken at the first location, based on the predicted relationship and trends. In some cases, the notification identifies the act and employment data for the first location. In some cases, the notification presents a comparison of the first location to other locations, such as a comparison of trends or data. In some cases, the notification includes a suggested preventive measure. For example, the notification may include suggestions for more policing, barriers, curfews, or other mitigating actions to reduce acts in the first area.

In some cases, the system iteratively updates the predictive model based on a comparison of prior-predicted trends for a time period in a location to current act and employment data for that time period in that location. For example, one or more trends for a location may prove to occur as predicted, which reinforces the models current training. In some cases, the predictive model iteratively learns based on preventive measures undertaken in locations with predicted trends. The predictive model identifies an effectiveness score for a preventive measure based on a prior predicted trend for the area and a predicted trend for the area after the application of the preventive measure.

Accordingly, implementing of the present invention will create a forward-looking predictive model which can be leveraged in a granular form using the above noted employment datasets layered into other data for predictions of crime in certain locations. In this way, the present invention provides modelling using machine learning and/or neural network computing to predict crime based on these determinations, create reports, and generate remedial solutions in a preemptive and proactive manner. The machine learning techniques can predict or model changes using a plurality of data associated with the employment data of the location and crime statistics, amongst other data described herein. And by aggregating the data, it is possible to generate a clear picture of all the factors that affect crime and predict or model such crime before it occurs. Thus, aspects of the technical solutions described herein provide an improvement in the technical field of crime prevention and forecasting of such crime by providing a technical solution to the problem of inaccurate modeling.

EXAMPLE USE CASE

An example use case may be, for example, a large shopping mall is planned for construction in a small town with little to no policing force. This project will bring in a large labor force consisting primarily of workers with access to heavy machinery, for example. Knowing that the workforce will consist of certain employment, the predictive modeling may predict an increase or spike in public drunkenness or other petty crimes within a certain time period from the start of the construction. The police would also be informed that theft of personal items due to an increase in population, or theft of construction equipment or supplies may also rise. Accordingly, this information can be provided to the police force so that they can proactively provide different modalities to combat the specifically predicted crimes, e.g., staff themselves or provide preventive measures in a preemptive manner to prevent such crimes.

By way of another example, a large commercial financial institution is due to lay off a large workforce from their professional workforce, e.g., high level executives within a particular location. Through the predictive modeling, it may be determined that this would lead to an increase in panhandling. Again, this information can be provided to the police force so that they can proactively staff themselves or provide preventive measures in a preemptive manner to prevent such crimes.

The foregoing examples have been provided merely for the purpose of explanation and are in no way to be construed as limiting of the technical solutions described herein. While aspects of the technical solutions described herein have been described with reference to an exemplary embodiment, it is understood that the words which have been used herein are words of description and illustration, rather than words of limitation. Changes may be made, within the purview of the appended claims, as presently stated and as amended, without departing from the scope and spirit of the technical solutions described herein. Although aspects of the technical solutions described herein have been described herein with reference to particular means, materials and aspects, technical solutions described herein is not intended to be limited to the particulars disclosed herein; rather, the technical solutions described herein extends to all functionally equivalent structures, methods and uses, such as are within the scope of the appended claims.

Although an example computing system has been described in FIG. 1, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks;

and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the disclosed elements and operations without departing from the scope of the present disclosure.

References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A method, comprising:
filtering, by one or more processors coupled with memory, employment data and act data for a plurality of geographic locations, wherein the employment data comprises at least one of a type of employment, a type of industry, or an employment rate;
identifying, by the one or more processors using a machine learning model trained on a historic employment data for the plurality of geographic locations and historic act data for the plurality of geographic locations, a relationship between the employment data and the act data;
predicting, by the one or more processors based on the relationship between the employment data and the act data identified by the machine learning model, trends in acts for the plurality of geographic locations;
determining, by the one or more processors, a preventive measure to apply in a first geographic location of the plurality of geographic locations based on an effectiveness score for the preventive measure identified using the machine learning model trained with prior predicted trends in the plurality of geographic locations after application of one or more preventive measures;

generating, by the one or more processors, a request for the preventive measure in the first geographic location of the plurality of geographic locations; and
transmitting, by the one or more processors, an instruction to a security system, located at the first geographic location and remote from the one or more processors, to actuate a subsystem of the security system in accordance with the request for the preventive measure generated based on the predicted trends and the relationship between the employment data and the act data.

2. The method of claim 1, wherein the employment data comprises at least one of income of employees, unemployment rate, head count for industry type, gender, and age of employees within the plurality of locations.

3. The method of claim 1, further comprising:
generating, by the one or more processors, trending crime data from the employment data and act data; and
injecting the trending crime data into the machine learning model to refine the machine learning model.

4. The method of claim 1, further comprising providing a weight for the employment data based on an impact the employment data has on acts.

5. The method of claim 1, comprising:
determining, by the one or more processors, that a frequency of an attribute of the act data exceeds a threshold; and
predicting, by the one or more processors, the trends in acts for the plurality of locations responsive to the frequency exceeding the threshold.

6. The method of claim 1, further comprising generating, by the one or more processors, a remediation solution based on the trends.

7. The method of claim 1, further comprising reinjecting, by the one or more processors, the trends into the machine learning model to refine the machine learning model for future trends in crime for the plurality of locations.

8. The method of claim 1, further comprising generating, by the one or more processors, a score for the first geographic location of the plurality of geographic locations.

9. The method of claim 1, comprising:
identifying, by the one or more processors, a query for a trend related to acts; and
predicting, by the one or more processors, the trends in acts for the plurality of locations responsive to identifying the query.

10. The method of claim 1, wherein the request includes a generated remedial action based on the predicted trends.

11. The method of claim 1, wherein transmitting the instruction to actuate the subsystem of the security system causes the subsystem to at least one of:
lock a door at the location,
turn on a security camera at the location,
turn on a light source at the location,
turn on a security camera at the location, or
enable a motion or sound sensor at the location.

12. A system comprising:
one or more processors coupled with memory, the one or more processors to:
filter employment data and act data for a plurality of geographic locations, wherein the employment data comprises at least one of type of employment, type of industry, or employment rate;
identify, using a machine learning model trained on a historic employment data for the plurality of geographic locations and historic act data for the plurality of geographic locations, a relationship between the employment data and the act data;

predict, based on the relationship between the employment data and the act data identified by the machine learning model, trends in acts for the plurality of geographic locations;

determine a preventive measure to apply in a first geographic location of the plurality of geographic locations based on an effectiveness score for the preventive measure identified using the machine learning model trained with prior predicted trends in the plurality of geographic locations after application of one or more preventive measures;

generate a request for the preventive measure in the first geographic location of the plurality of geographic locations; and transmit an instruction to a security system, located at the first geographic location and remote from the one or more processors, to actuate a subsystem of the security system in accordance with the request for the preventive measure generated based on the predicted trends and the relationship between the employment data and the act data.

13. The system of claim 12, wherein the one or more processors are further configured to:

generate trending crime data from the employment data and act data; and inject the trending crime data into the machine learning model to refine the machine learning model.

14. The system of claim 12, wherein the one or more processors are configured to provide a weight for the employment data based on an impact the employment data has on acts.

15. The system of claim 12, wherein the one or more processors are configured to:

determine that a frequency of an attribute of the act data exceeds a threshold; and predict the trends in acts for the plurality of locations responsive to the frequency exceeding the threshold.

16. The system of claim 12, wherein the one or more processors are configured to generate a remediation solution based on the trends.

17. The system of claim 12, wherein the one or more processors are configured to reinject the trends into the machine learning model to refine the machine learning model for future trends in crime for the plurality of locations.

18. The system of claim 12, wherein the one or more processors are configured to generate a score for a first location of the plurality of locations.

19. A non-transitory computer-readable medium, comprising instructions embodied thereon that when executed cause one or more processors to:

filter employment data and act data for a plurality of geographic locations, wherein the employment data comprises at least one of type of employment, type of industry, or employment rate;

identify, using a machine learning model trained on a historic employment data for the plurality of geographic locations and historic act data for the plurality of geographic locations, a relationship between the employment data and the act data;

predict, based on the relationship between the employment data and the act data identified by the machine learning model, trends in acts for the plurality of geographic locations;

determine a preventive measure to apply in a first geographic location of the plurality of geographic locations based on an effectiveness score for the preventive measure identified using the machine learning model trained with prior predicted trends in the plurality of geographic locations after application of one or more preventive measures;

generate a request for the preventive measure in the first geographic location of the plurality of geographic locations; and transmit an instruction to a security system, located at the first geographic location and remote from the one or more processors, to actuate a subsystem of the security system in accordance with the request for the preventive measure generated based on the predicted trends and the relationship between the employment data and the act data.

20. The non-transitory computer-readable medium of claim 19, wherein the instructions cause the one or more processors to:

determine that a frequency of an attribute of the act data exceeds a threshold; and predict the trends in acts for the plurality of locations responsive to the frequency exceeding the threshold.

* * * * *